Dec. 17, 1968   R. A. ELM   3,417,192
JUNCTION BOX
Filed Jan. 23, 1967
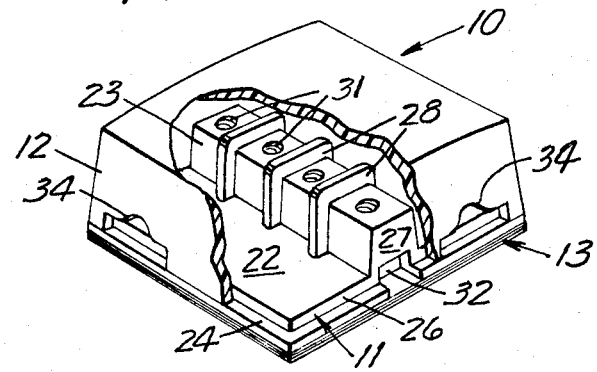
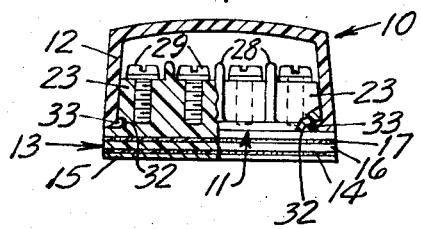
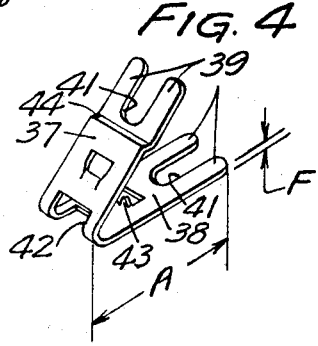
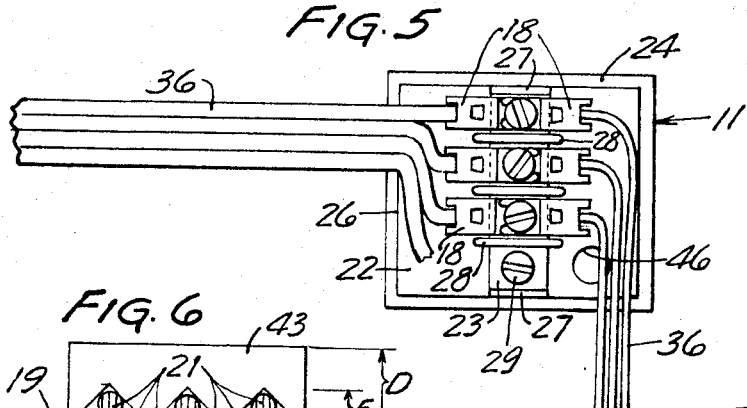
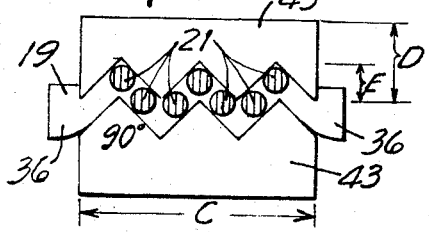
INVENTOR.
ROBERT A. ELM
BY
Carpenter, Kinney & Coulter
ATTORNEYS

United States Patent Office 3,417,192
Patented Dec. 17, 1968

3,417,192
JUNCTION BOX
Robert A. Elm, St. Paul, Minn., assignor to Minnesota
Mining and Manufacturing Company, St. Paul, Minn.,
a corporation of Delaware
Filed Jan. 23, 1967, Ser. No. 611,138
3 Claims. (Cl. 174—59)

ABSTRACT OF THE DISCLOSURE

A two piece injection molded insulating plastic junction box consisting generally of a base member and a cover which when removed exposes a connector platform divided into equal portions by thin walls, the top of one or more of such portions having stamped, bent, and folded, spring metal, insulation piercing, high contact pressure producing, V-shaped connector elements secured thereto.

This invention relates to an accessory for low voltage electrical wiring systems and has particular reference to a self adhering junction box having insulation piercing wire connectors.

In low voltage wiring applications, such as, for example, audio, control wiring, and inter-com, it is desirable to provide neat, convenient, and reliable systems. As an example of components designed for such purposes, U.S. Patent No. 3,270,122 discloses a tape-like multiple-conductor flat cable and connector block for use therewith, each of which can be adherently attached to wall surfaces, such as wood, stone, and plaster.

One problem encountered in designing connector components is to effect and maintain an electrical connection to stranded wire which remains effective and reliable even when the individual strands settle, move, or expand or contract, due to heat cycles, within the insulation covering. The present invention provides a junction box having insulation piercing connectors which are particularly adapted to readily effect and maintain reliable electrical contact with stranded wire, and which work equally well with solid wire, the box being securable to various wall surfaces producing a neat and reliable wiring system accessory.

The device of the present invention consists generally of a two member insulating plastic junction box which is readily securable to various wall surfaces and which permits rapid, easy, and reliable connections of different types of electrical wires. The base member of the box, which is self adhering to wall surfaces and which provides means for neatly receiving and securely retaining the box cover and for positioning and separating connectors secured thereto, consists generally of a plate portion and a connector platform portion. The plate portion has rabbeted edges and locking recesses on one side to accept and rigidly secure the upper member, or cover, of the box and has on the other side a coextensive composite resilient pressure sensitive adhesive layer for attaching the box to to wall surfaces. The connector platform is generally in the form of a rectangular block divided into equal portions by thin walls, each portion having recesses through the top for receiving connector engaging screws. The self retentive and readily engageable cover member is a generally thin substantially square shell having openings or ports for the entrance of the electrical cable or wires and an opposing pair of nubs to secure the cover to the base member, the latter being provided with corresponding recesses to receive the nubs. The insulation piercing, multicontact, high pressure, low resistance conductor connectors of the junction box are folded pieces of spring metal centrally open at the fold area to receive the wire, having toothed contact members to pierce the wire-insulation and contact the wire, and slotted to receive mounting screws for securing the connector to the platform block.

The invention is more fully understood by reference to the drawing accompanying and forming a part of this specification wherein:

FIGURE 1 is a perspective view of the junction box, without the connectors, with a portion of the cover broken away;

FIGURE 2 is a view in elevation of the junction box and including the connector platform, mainly in section;

FIGURE 3 is a plan view, on an enlarged scale, of a connector blank;

FIGURE 4 is a perspective view of the connector element in condition for installing in a junction box;

FIGURE 5 is a top plan view of the base member, the cover being removed, with a combination of connectors and conductors secured thereto; and FIGURE 6 is a detail view of the toothed contact members in conductive spring-loaded contact with a stranded conductor.

As illustrated in FIG. 1 the exterior of the junction box 10 presents a generally box-shaped appearance with inclined sides and a curved top. For purposes of the present description and the appended claims the junction box will be referred to as occupying the upright position indicated in FIGURES 1 and 2 of the drawing, but it is to be appreciated that the box is mountable in any position. The box is composed of two major parts, namely, a base member 11 and a cover member or shell 12, each being formed, preferably injection molded, of a tough, resilient, insulating plastic, such as, for example, a terpolymer of acrylonitrile, butadiene and styrene. The flat bottom of base member 11 is provided with resilient adhesive means 13, consisting of an outer layer of pressure sensitive adhesive 14, superimposed over a layer of resilient foam 16, which is secured to the bottom of the base member, preferably by another layer of pressure sensitive adhesive 17, for attachment of the box to various types of wall surfaces; and with cooperating connectors 18 for piercing the insulation 19 (FIG. 6) and effecting reliable electrical contact with the conductors 21.

More specifically, the base member 11 is composed of a substantially rectilinear plate portion 22 and a substantially rectangular connector platform portion 23. The plate portion 22 has on the top side a rabbeted edge configuration having, in the illustrated preferred embodiment, a base surface 24 and a wall surface 26. The base and wall surfaces 24 and 26 are perpendicular to each other forming an extended ledge along the edge of the plate portion 22 against which the edges of cover 12 can be positioned and rigidly retained. An opening 46 (FIG. 5) through the plate portion 22 permits the running of wires through the surface to which the box is attached to the connectors 18.

The connector platform portion 23 of the base member 11 is a substantially rectangular block and extends centrally across the top side of the plate portion 22 and up to opposing wall surfaces 26. The ends 27 of the block are inclined slightly toward each other as they extend away from the plate portion 22. Platform block 23 is equally divided into a plurality of connector areas by connector separators 28, which comprise thin walls extending outwardly from the block. The walls 28, which electrically insulate the connectors one from another, are sufficiently spaced apart to readily receive a connector 18 yet are close enough together to restrain the connector from turning when connector fastening screws 29 are being tightened. The top of each connector area of platform block 23 has a centrally located screw receiving recess 31.

Recesses 32 (FIG. 1) are located along two opposing edge wall surfaces 26, adjacent to and extending slightly into the platform ends 27, to provide nub receiving openings for securing the cover 12 to the base member 11. As illustrated by FIG. 1, the recesses 32 preferably extend downwardly through the base surface 24 to facilitate the molding operation.

Attached to the flat bottom side of the base member 11 is an outer layer of normally tacky pressure-sensitive adhesive 14 over a layer of resilient foam 16. In one embodiment, and as illustrated in the drawing, the layer of resilient foam 16 is secured to the bottom of the base member 11 by an inner layer of pressure-sensitive adhesive 17. The outer layer of pressure-sensitive adhesive 14 and the resilient foam 16 permits the affixing of the junction box 10 to various wall surfaces such as cement, wood, plaster, etc. It is desirable to provide the outer layer of pressure-sensitive adhesive 18 with a removable protective liner 15, which is removed immediately prior to application of the junction box to a wall surface.

The cover member 12 is readily securable to the base member 11 producing a rigid structure. The cover 12 consists generally of a box-like shell having edges defining one open side. Locking nubs 33 are located adjacent two opposing edges and are adapted to fit snugly within the nub receiving recesses 32 of the base member 11. In applying the cover the nubs slide down the inclined ends 27 of the connector platform, spreading the corresponding cover sides apart, and snap into position within the recesses 32. The edges of the cover opening become engaged with the base and wall surfaces 24 and 26 producing a secure and rigid compartment.

The cover 12 is cut away along its edges to provide openings or ports 34 for the entrance of the cable or wire 36. The shape of the ports 34, as illustrated in FIG. 1, provides a neat entrance for either round or flat multi-conductor cables or single conductor wires. The ports 34 are offset from a center position to facilitate installation in corners and to avoid running immediately into the connector platform 23.

Referring now to FIGS. 3, 4, 5, and 6, each of the connectors 18 is formed from a flat strip of spring metal, in the preferred embodiment spring temper brass, which is cut or stamped out and bent and folded to shape, forming a V-shaped element having opposing upper and lower jaw members, 37 and 38 respectively (FIG. 4). The free ends of the connector element 18 have each a pair of extended legs 39 forming a U-shaped slot or recess 41 which receive a screw 29 for securing the connector 18 to the connector platform block 23. Between a wire receiving central opening 42 and each free end the metal strip is cut or stamped to provide a single row of teeth 43 which is bent so as to mesh with the opposing row when the ends of the connector are clamped together. The teeth 43 must be long and pointed enough (FIG. 6) to readily pierce and reach through the insulation 19 and make contact with the conductors 21. Between slot 41 and teeth 43 the upper jaw member 37 has a step-down, double right angle bend 44 which is offset toward the lower jaw member 38 (FIG. 4).

As an example of some of the dimensions of a connector which is suitable for use with, for example, 26 to 18 gage wire, the length A of the jaw members 37 and 38, when connector is folded is .710 inch (FIG. 4), the width B of the connector is .280 inch (FIG. 3), and the width C of the rows of teeth is .090 inch (FIG. 6). The total extension D of the teeth inwardly from the inside surface of each jaw member is .035 inch, the distance E from the valley to the point of each tooth being .015 inch, these dimensions being the same for each row of teeth. In the illustrated embodiment, the bottom row of teeth has three points which mesh with the upper other row which has four. The thickness F of the teeth, which equals the thickness of the metal from which the connector is stamped, is .020 inch (FIG. 4). The edges of the teeth meet at a 90° angle to form the points.

The step-down bend 44 and the radius of curvature of the fold joining the jaw members are such that when the connector 18 is clamped shut, without a wire 36 having been inserted, i.e. when both pair of legs 39 are flat against each other, the upper and lower jaw members 37 and 38 are substantially parallel with each other and the two rows of teeth 43 mesh and almost touch each other. As a result when a wire 36 is inserted through the opening 42 and extended past the teeth 43 and the legs 39 are clamped flat together, the teeth 43 are brought together piercing the insulation 19 (see FIG. 6) and contacting the several wires of the enclosed conductor 21, and the teeth are held thereagainst by a constant high spring force produced by a bow formed in the upper and lower jaw members 37 and 38 when the conductors 21 displace the teeth 43 outwardly. The high pressure contact effected and maintained produces a desirable permanent and low resistance connection.

If the wire contains stranded conductors the teeth separate them making multiple contacts therewith which are maintained under high pressure due to the bow formed in the resilient jaw members produced by the outward displacement of the teeth, a distance substantially equal to the thickness of the conductors. If the conductor is a single solid wire the teeth catch the wire between a valley in one row and a point in the other row and sufficiently cut into it to make effective contact and likewise remain in a taut position due to the springiness of the connector. Consequently both solid and stranded wires can be reliably electrically connected without removing the insulation.

The junction box of the present invention has a wide scope of applications which includes terminating, tapping, or splicing flat or round multi-conductor cables or single conductor solid or stranded wires. For example, FIG. 5 illustrates a multi-conductor flat cable terminal connection to round lead wires.

While a specific embodiment of this invention has been illustrated and described, it will be understood that this is by way of illustration only, and that certain changes and modifications may be made within the contemplation of this invention and within the scope of the following claims.

What is claimed is:

1. A junction box suitable for use in terminating, tapping or splicing low voltage electrical wire, said junction box comprising in combination:

(a) a base member formed of a plastic insulating material and including a rectilinear plate portion, the bottom side thereof having adhering means coextensively secured thereto by a layer of pressure sensitive adhesive, said adhering means comprising in order a layer of resilient foam and an outer layer of pressure sensitive adhesive, the top side of said plate portion having a rabbeted edge configuration providing cover receiving base and wall surfaces, and an elongate block connector platform portion, said block extending medially across said top side of said plate portion up to said wall surface, the ends of said block being slightly inclined toward each other upwardly from said wall surface, said platform having at least one thin-walled connector separator transversely dividing the platform into equal portions, each such equal portion of the platform being recessed from the top to form a screw receiving recess, the wall surface below the inclined ends of the connector platform and an adjacent portion of the platform ends being recessed to form nub receiving cover locking recesses;

(b) at least one conductor connector comprising an elongate piece of flat, thin, conductive resilient metal folded to provide a V-shaped element having a lower jaw member and an upper jaw member, each of the free ends of the lower and upper jaw members having a pair of legs spaced apart to form U-shaped open-ended screw receiving slots, each of said lower and upper jaw members having intermediate their ends and extending inwardly therefrom a transverse single row of cooperating, meshing, insulation piercing teeth, said folded portion of said connector element having a conductor receiving opening, said upper jaw member having a step-down, double right angle bend from its teeth to its slot providing for meshing of the teeth when the two pairs of said extended legs are brought flat together, each said connector being secured to the top of said connector platform by a screw engaged within said screw receiving recesses; and (c) a cover member comprising a box-like shell having an open side, the edges defining said open side corresponding in shape to said cover receiving rabbeted edge configuration of said base member, said cover having a plurality of conductor receiving openings and having a pair of cover locking nubs located adjacent to opposite edges defining said open side and being adapted to fit within the cover locking recesses of said base member.

2. The device of claim 1 wherein said outer layer of pressure sensitive adhesive is coextensively covered by a removable protection liner.

3. An electrical conductor connector comprising an elongate piece of flat, thin, conductive resilient metal folded to provide a V-shaped element having a lower jaw member and an upper jaw member, each of the free ends of the lower and upper jaw members having a pair of legs spaced apart to form U-shaped open-ended screw receiving slots, each of said lower and upper jaw members having intermediate their ends and extending inwardly therefrom a transverse single row of cooperating, meshing, insulation piercing teeth, said folded portion of said connector element having a conductor receiving opening, said upper jaw member having a step-down, double right angle bend from its teeth to its slot providing for meshing of the teeth when the two pairs of said extended legs are brought flat together.

References Cited

UNITED STATES PATENTS

| 2,534,881 | 12/1950 | Schroeder | 339—97 X |
| 2,998,589 | 8/1961 | Kulka | 339—198 |
| 3,218,602 | 11/1965 | Morse | 339—97 |

LEWIS H. MYERS, *Primary Examiner.*

D. A. TONE, *Assistant Examiner.*

U.S. Cl. X.R.

339—97, 198